United States Patent
Liu et al.

(10) Patent No.: US 12,228,704 B2
(45) Date of Patent: Feb. 18, 2025

(54) IMAGING LENS, CAMERA MODULE AND CAMERA

(71) Applicant: JIANGXI LIANYI OPTICS CO., LTD., Nanchang (CN)

(72) Inventors: Xuming Liu, Nanchang (CN); Tian Zhang, Nanchang (CN); Haojie Zeng, Nanchang (CN); Jiyong Zeng, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 557 days.

(21) Appl. No.: 17/565,420

(22) Filed: Dec. 29, 2021

(65) Prior Publication Data
US 2022/0121014 A1   Apr. 21, 2022

Related U.S. Application Data

(63) Continuation-in-part of application No. PCT/CN2020/078023, filed on Mar. 5, 2020.

(30) Foreign Application Priority Data

Jul. 3, 2019  (CN) .......................... 201910592465.3

(51) Int. Cl.
*G02B 13/00* (2006.01)
*G02B 9/60* (2006.01)

(52) U.S. Cl.
CPC .......... *G02B 13/0045* (2013.01); *G02B 9/60* (2013.01)

(58) Field of Classification Search
CPC ...... G02B 13/0045; G02B 9/60; G02B 13/06; G02B 13/18
See application file for complete search history.

(56) References Cited

U.S. PATENT DOCUMENTS

2015/0098137 A1* 4/2015 Chung .................... G02B 9/60
                                                        359/714
2017/0205608 A1 7/2017 Li et al.
(Continued)

FOREIGN PATENT DOCUMENTS

CN         101051110 A    10/2007
CN         201965291 U     9/2011
(Continued)

OTHER PUBLICATIONS

Gross et al. "Handbook of Optical Systems vol. 3: Aberration Theory and Correction of Optical Systems" Weinheim Germany, Wiley-VCH Verlag Gmbh & Co. KGaA, pp. 377-379 (Year: 2007).*
(Continued)

*Primary Examiner* — Cara E Rakowski
*Assistant Examiner* — Jennifer A Jones
(74) *Attorney, Agent, or Firm* — JEEN IP LAW, LLC

(57) ABSTRACT

Disclosed are an imaging lens, a camera module and a camera. Five lenses are adopted in the imaging lens, which from an object side to an imaging plane, are: a first lens having a negative refractive power, where a paraxial region of an object side surface of the first lens is concave; a second lens having a positive refractive power; a third lens having a positive refractive power, where a paraxial region of an image side surface of the third lens is concave, and at least a portion away from an optical axis of the image side surface of the third lens is convex; a fourth lens having a positive refractive power; and a fifth lens having a negative refractive power. The camera includes the camera module, and the camera module includes the imaging lens and an image sensor opposite to the imaging lens.

15 Claims, 7 Drawing Sheets

(56) References Cited

U.S. PATENT DOCUMENTS

| | | | |
|---|---|---|---|
| 2019/0064485 A1* | 2/2019 | Arita | G02B 13/04 |
| 2019/0101725 A1 | 4/2019 | Jung et al. | |
| 2021/0263287 A1* | 8/2021 | Wenren | G02B 13/0045 |

FOREIGN PATENT DOCUMENTS

| | | | | |
|---|---|---|---|---|
| CN | 103592743 A | | 2/2014 | |
| CN | 104516090 A | | 4/2015 | |
| CN | 107085277 A | | 8/2017 | |
| CN | 108594403 A | | 9/2018 | |
| CN | 112083548 A | * | 12/2020 | |
| KR | 20190005322 A | | 1/2019 | |

OTHER PUBLICATIONS

Teledyne, Field of View and Angular Field of View, Princeton Instruments, Sep. 26, 2020, retrieved electronically from the waybackmachine on Apr. 10, 2023 (Year: 2020) (Year: 2020).*

WIPO, International Search Report for PCT Application No. PCT/CN2020/078023, May 25, 2020.

Written Opinion of the International Searching Authority for No. PCT/CN2020/078023.

Decision to grant patent from China patent office in a counterpart Chinese patent Application 201910592465.3.

\* cited by examiner

Radius of the pupil: 0.3877 millimeters

Nominal aperture

Millimeter

Maximum half FOV: 60.0000 Deg

FOV: angle

Micron

IMAGING LENS, CAMERA MODULE AND CAMERA

CROSS REFERENCE TO RELATED APPLICATION

This application is a continuation-in-part of an international application No. PCT/CN2020/078023 filed on Mar. 5, 2020. This international application claims priority to a Chinese patent application No. 201910592465.3 filed on Jul. 3, 2019. The entirety of the two applications is hereby incorporated into this application by reference.

TECHNICAL FIELD

The present disclosure relates to the field of optical imaging technologies, and particularly to an imaging lens, a camera module and a camera.

BACKGROUND

A lens is an important part of an optical imaging system, which is now one of the standard configurations for terminals, such as mobile phones, tablets, security monitoring equipment, and driving recorders. In recent years, with the continuous development of mobile information technologies, the demand for terminals increases continuously, and the number of lenses mounted on the terminal is also increased.

As the users are keen on thinner and lighter terminals, and in order to obtain better imaging effects of such terminals, imaging lenses are required to not only satisfy miniaturization but also have a wide field of view. However, in the related art, the current imaging lenses on the market are unable to achieve a good balance between miniaturization and the wide field of view; therefore, the field of view is generally sacrificed after the miniaturization of the lens, or there is a large volume after a wide field of view of the lens is obtained.

SUMMARY

According to embodiments of the present disclosure, an imaging lens is provided. The imaging lens includes five lenses, and from an object side to an imaging plane, the five lenses are as follows:
- a first lens with a negative refractive power, where a paraxial region of an object side surface of the first lens is concave;
- a second lens with a positive refractive power;
- a third lens with a positive refractive power, where a paraxial region of an image side surface of the third lens is concave and at least a portion away from an optical axis of the image side surface of the third lens is convex;
- a fourth lens with a positive refractive power; and
- a fifth lens with a negative refractive power;

where the imaging lens satisfies expressions:

$1 < R_6/R_5 < 4$;

$0 < f_{34}/f < 1$;

$(V_3 - V_5) < 7$; and $0 < f_2/f_3 < 1$;

where $R_5$ represents a radius of curvature of an object side surface of the third lens, $R_6$ represents a radius of curvature of the image side surface of the third lens, $f_{34}$ represents a combined focal length of the third lens and the fourth lens, f represents a focal length of the imaging lens, $V_3$ represents a dispersion coefficient of the third lens, $V_5$ represents a dispersion coefficient of the fifth lens, $f_2$ represents a focal length of the second lens, and $f_3$ represents a focal length of the third lens.

According to the embodiments of the present disclosure, a camera module is provided, which includes the above-mentioned imaging lens and an image sensor opposite to the imaging lens.

According to the embodiments of the present disclosure, a camera is provided, which includes the camera module mentioned above, a processor and a memory. The camera module is configured to capture one or more images. The processor is configured to process the captured one or more images. The memory is configured to store the captured one or more images.

Figure 1A:
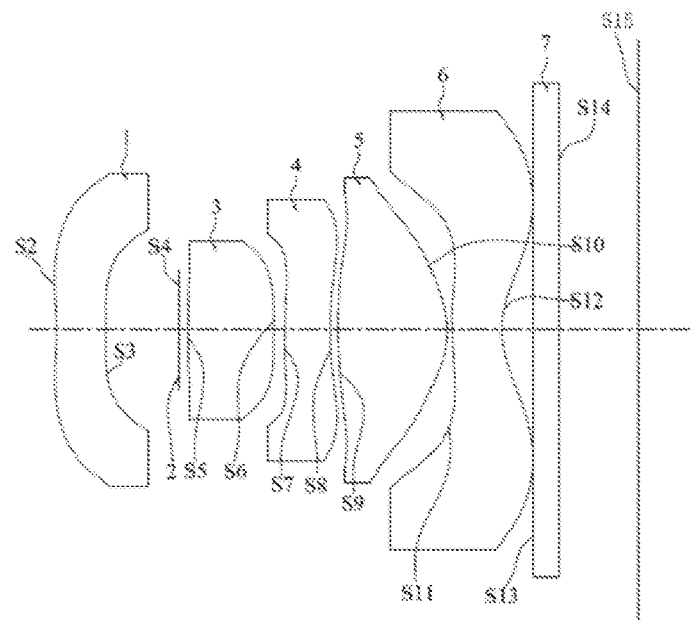
FIG. 1a is a schematic structural diagram of an imaging lens provided by a first embodiment of the present disclosure.

The following specific embodiments will further illustrate the present disclosure in conjunction with the above-mentioned drawings.

DETAILED DESCRIPTION OF PREFERRED EMBODIMENTS

In order to facilitate understanding of the present disclosure, the present disclosure will be described comprehensively below with reference to the related drawings. Various embodiments of the present disclosure are shown in the drawings. However, the present disclosure can be implemented in many different forms and is not limited to the embodiments described herein. Rather, the purpose of these embodiments is to make the present disclosure more thorough and comprehensive.

Unless otherwise defined, all technical and scientific terms used herein have the same meaning as commonly understood by those skilled in the technical field of the present disclosure. The terms used in the description of the present disclosure herein are only for the purpose of describing specific embodiments, and are not intended to limit the present disclosure. The terms "and/or" as used herein include any of one or more listed items and all combinations thereof.

Embodiment 1

Referring to FIG. 1a, a structural diagram of an imaging lens provided by a first embodiment of the present disclosure is shown. The imaging lens includes five lenses. From an object side to an imaging plane S15, the five lenses are: a first lens 1 with a negative refractive power, a second lens 3 with a positive refractive power, a third lens 4 with a positive refractive power, a fourth lens 5 with a positive refractive power and a fifth lens 6 with a negative refractive power. A paraxial region of an object side surface S2 of the first lens is concave, and the other regions of the object side surface S2 that are away from an optical axis are convex. A paraxial region of an image side surface S8 of the third lens is concave, and at least a portion away from an optical axis of the image side surface S8 of the third lens is convex. In addition, a stop 2 is disposed between the first lens 1 and the second lens 3. A plate glass 7 is disposed between the fifth lens 6 and the imaging plane S15, and a paraxial region of an object side surface S11 of the fifth lens is convex and other regions away from the optical axis of the object side surface S11 of the fifth lens are concave.

In this embodiment, the first lens 1, the second lens 3, the third lens 4, the fourth lens 5 and the fifth lens 6 are all aspherical lenses, and the surface shape of each aspherical lens satisfies an expression:

$$z = \frac{ch^2}{1+\sqrt{1-(1+k)c^2h^2}} + \Sigma A_{2i}h^{2i};$$

where z represents a vector height between a point on a curved surface and a vertex of the curved surface along the optical axis, h is a distance between the point on the curved surface and the optical axis, c is a paraxial radius of curvature of the surface, k is quadratic surface coefficient conic, and $A_{2i}$ is a 2i-th order aspheric profile coefficient, $$\Sigma A_{2i}h^{2i} = A_4h^4 + A_6h^6 + A_8h^8 + A_{10}h^{10} + A_{12}h^{12} + A_{14}h^{14} + A_{16}h^{16} + A_{18}h^{18} + A_{20}h^{20},$$

where values of $A_4, A_6, A_8, A_{10}, A_{12}, A_{14}, A_{16}, A_{18}$ and $A_{20}$ are as shown in a table below.

Further, the imaging lens satisfies an expression:

$$|R_4/R_3| > 1.1; \tag{1}$$

where $R_3$ represents a radius of curvature of an object side surface S5 of the second lens, and $R_4$ represents a radius of curvature of an image side surface S6 of the second lens. When the lower limit of the expression (1) is exceeded, the second lens 3 is not easy to be shaped, and high-order aberrations would occur for off-axis light, which deteriorates the performance.

Further, the imaging lens satisfies an expression:

$$1 < R_6/R_5 < 4; \tag{2}$$

where $R_5$ represents a radius of curvature of an object side surface S7 of the third lens, and $R_6$ represents a radius of curvature of the image side surface S8 of the third lens. The expression (2) indicates that the third lens 4 serves as a convex lens at the paraxial region thereof, that is, a paraxial region of the image side surface S8 of the third lens is concave, and a paraxial region of the object side surface S7 of the third lens is convex. When the expression (2) is satisfied, it is easy to correct the on-axis aberrations.

Further, the imaging lens satisfies an expression:

$$0 < (CT_1 \pm CT_2 + CT_3 + CT_4 + CT_5)/T_d < 1; \tag{3}$$

where $CT_1$ represents a center thickness of the first lens 1, $CT_2$ represents a center thickness of the second lens 3, $CT_3$ represents a center thickness of the third lens 4, $CT_4$ represents a center thickness of the fourth lens 5, $CT_5$ represents a center thickness of the fifth lens 6, and $T_d$ represents a distance on the optical axis that is between the object side surface S2 of the first lens and an image side surface S12 of the fifth lens. When the expression (3) is satisfied, the total optical length of the imaging lens can be effectively shortened, which facilitates the miniaturization of the imaging lens.

Further, the imaging lens satisfies an expression:

$$(V_3 - V_5) < 7; \tag{4}$$

where $V_3$ represents a dispersion coefficient of the third lens 4, and $V_5$ represents a dispersion coefficient of the fifth lens 6. When the expression (4) is satisfied, the chromatic aberrations of the system can be effectively corrected.

Further, the imaging lens satisfies an expression:

$$-3.5 < f_1/f < -2.5; \tag{5}$$

where $f_1$ represents a focal length of the first lens 1, and f represents a focal length of the imaging lens. When the lower limit of the expression (5) is exceeded, the refractive power of the object side surface S2 of the first lens is increased which is not beneficial to ensure the performance at the periphery, and the sensitivity to eccentricity is increased. When the upper limit of the expression (5) is exceeded, it is difficult to correct the field curvature.

Further, the imaging lens satisfies an expression:

$$0 < f_2/f_3 < 1; \quad (6)$$

where $f_2$ represents a focal length of the second lens 3, and $f_3$ represents a focal length of the third lens 4. When the lower limit of the expression (6) is exceeded, the field curvature and distortion are excessively increased in a negative direction, which are difficult to be corrected. When the upper limit of the expression (6) is exceeded, the field curvature and distortion are excessively increased in a positive direction, which are also difficult to be corrected.

Further, the imaging lens satisfies an expression:

$$0 < (R_7 + R_8)/(R_7 - R_8) < 1; \quad (7)$$

where $R_7$ represents a radius of curvature of an object side surface S9 of the fourth lens, and $R_8$ represents a radius of curvature of an image side surface S10 the fourth lens. When the lower limit of the expression (7) is exceeded, high-order aberrations would occur for off-axis light, which deteriorates the performance. When the upper limit of the expression (7) is exceeded, it is difficult to correct the field curvature and coma aberrations.

Further, the imaging lens satisfies an expression:

$$0 < T_d/ImgH < 1; \quad (8)$$

where $T_d$ represents the distance on the optical axis that is between the object side surface S2 of the first lens and the image side surface S12 of the fifth lens, and ImgH represents half of an image height of the imaging lens on the imaging plane S15. When the expression (8) is satisfied, the total optical length of the imaging lens can be effectively shortened, which facilitates the miniaturization of the imaging lens.

Further, the imaging lens satisfies an expression:

$$0 < f_{34}/f < 1; \quad (9)$$

where $f_{34}$ represents a combined focal length between the third lens 4 and the fourth lens 5, and f represents the focal length of the imaging lens. When the lower limit of the expression (9) is exceeded, since the focal length of the entire imaging lens needs to be kept unchanged, the refractive power of the object side surface S2 of the first lens is caused to be increased which is not beneficial to ensure the performance at the periphery, and the sensitivity to eccentricity is increased. When the upper limit of the expression (9) is exceeded, it is difficult to correct the field curvature.

Further, the second lens 3 satisfies an expression:

$$1 \le CT_2/ET_2 \le 1.5,$$

where $CT_2$ represents the center thickness of the second lens 3, and $ET_2$ represents an edge thickness of the second lens 3.

Further, the fourth lens 5 satisfies an expression:

$$CT_4/ET_4 \ge 3,$$

where $CT_4$ represents the center thickness of the fourth lens 5, and $ET_4$ represents an edge thickness of the fourth lens 5.

Further, the fifth lens 6 satisfies an expression:

$$CT_5/ET_5 \le 0.5,$$

where $CT_5$ represents the center thickness of the fifth lens 6, and $ET_5$ represents an edge thickness of the fifth lens 6.

Further, the center thickness of the fourth lens 5 is greater than that of each of the first lens 1, the second lens 3, the third lens 4 and the fifth lens 6.

Further, the edge thickness of the fifth lens 6 is greater than that of each of the first lens 1, the second lens 3, the third lens 4 and the fourth lens 5.

Further, the maximum diameter of the stop 2 is smaller than that of each of the first lens 1, the second lens 3, the third lens 4, the fourth lens 5 and the fifth lens 6. The maximum diameter of the fifth lens 6 is greater than that of each of the first lens 1, the second lens 3, the third lens 4, and the fourth lens 5.

Referring to Table 1-1, parameters related to various lenses of the imaging lens in this embodiment are shown, where R represents a radius of curvature, d represents a spacing distance between the optical surfaces, nd represents the refractivity of the material, and Vd represents an Abbe number of the material.

TABLE 1-1

| Surface No. | Surface name | R | d | nd | Vd |
|---|---|---|---|---|---|
| | Object surface | — | — | | |
| S2 | Object side surface of the first lens | -3.585 | 0.384 | | |
| S3 | Image side surface of the first lens | 11.624 | 0.578 | 1.544 | 55.951 |
| S4 | Stop surface | — | 0.065 | | |
| S5 | Object side surface of the second lens | 3.727 | 0.684 | 1.544 | 55.951 |
| S6 | Image side surface of the second lens | -6.616 | 0.085 | | |
| S7 | Object side surface of the third lens | 2.362 | 0.364 | 1.615 | 25.92 |
| S8 | Image side surface of the third lens | 2.646 | 0.058 | | |
| S9 | Object side surface of the fourth lens | 3.612 | 0.855 | 1.544 | 55.951 |
| S10 | Image side surface of the fourth lens | -0.740 | 0.036 | | |
| S11 | Object side surface of the fifth lens | 2.240 | 0.400 | 1.671 | 19.238 |
| S12 | Image side surface of the fifth lens | 0.621 | 0.243 | | |
| S13 | Object side surface of the plate glass | — | 0.210 | 1.517 | 64.198 |
| S14 | Image side surface of the plate glass | — | 0.628 | | |
| S15 | Imaging plane | — | — | | |

Referring to Tables 1-2-A and 1-2-B, coefficients of various aspherical surfaces of the imaging lens in this embodiment are shown.

TABLE 1-2-A

| Surface No. | k | $A_4$ | $A_6$ | $A_8$ | $A_{10}$ |
|---|---|---|---|---|---|
| S2 | -102.406 | 6.50E-01 | -2.12E-01 | -6.78E-01 | 1.74E+00 |
| S3 | 193.117 | 1.51E+00 | -2.75E-01 | 7.54E-02 | -1.04E+01 |
| S5 | 0.000 | 3.00E-02 | -8.68E+00 | 1.57E+02 | -1.64E+03 |

TABLE 1-2-A-continued

| Surface No. | k | $A_4$ | $A_6$ | $A_8$ | $A_{10}$ |
|---|---|---|---|---|---|
| S6 | 75.779 | -1.60E+00 | 7.37E-01 | -2.73E+00 | 8.79E-01 |
| S7 | -48.467 | -4.91E-01 | -1.82E+00 | -7.35E-02 | 1.75E+00 |
| S8 | 0.000 | -1.55E-01 | -8.21E-02 | 2.25E-02 | -2.06E-02 |
| S9 | 0.000 | -3.30E-02 | -3.98E-02 | -1.06E-02 | 1.02E-02 |
| S10 | -4.227 | -1.70E-01 | -1.63E-01 | 4.44E-02 | 1.89E-01 |
| S11 | -18.322 | -5.65E-01 | -4.34E-01 | 2.33E-01 | 1.45E-01 |
| S12 | -4.774 | -4.76E-01 | 3.01E-01 | -1.26E-01 | 4.48E-02 |

TABLE 1-2-B

| Surface No. | $A_{12}$ | $A_{14}$ | $A_{16}$ | $A_{18}$ | $A_{20}$ |
|---|---|---|---|---|---|
| S2 | -1.19E+00 | -3.71E-01 | 7.80E-01 | 4.94E-02 | -2.74E-01 |
| S3 | 4.95E+01 | -4.57E+00 | -3.17E+01 | -1.02E+02 | -1.33E+02 |
| S5 | 8.30E+03 | -1.70E+04 | 0.00E+00 | 0.00E+00 | 0.00E+00 |
| S6 | -1.16E+01 | 3.22E+01 | -4.49E+01 | 9.44E+01 | -6.05E+02 |
| S7 | -6.70E+00 | 1.14E+01 | -1.23E+01 | -1.43E+02 | 1.05E+02 |
| S8 | | | | | |
| S9 | | | | | |
| S10 | 6.34E-02 | -1.75E-03 | -6.54E-02 | -2.91E-02 | 8.04E-03 |
| S11 | -1.00E-02 | -3.02E-02 | 9.46E-02 | -6.63E-03 | -4.59E-02 |
| S12 | -2.10E-02 | 5.72E-03 | -2.00E-04 | -5.91E-05 | 7.44E-06 |

Figure 1B:
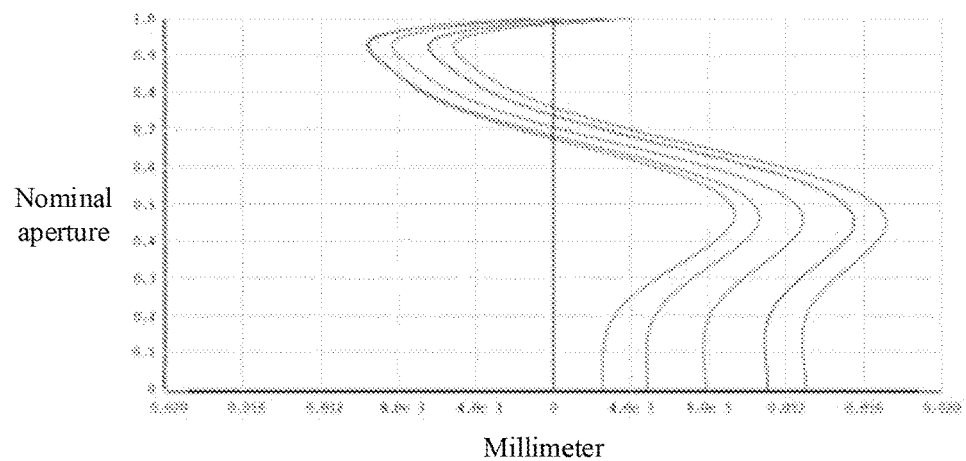
FIG. 1b is a diagram showing on-axis spherical aberration curves of the imaging lens provided by the first embodiment of the present disclosure.
Figure 1C:
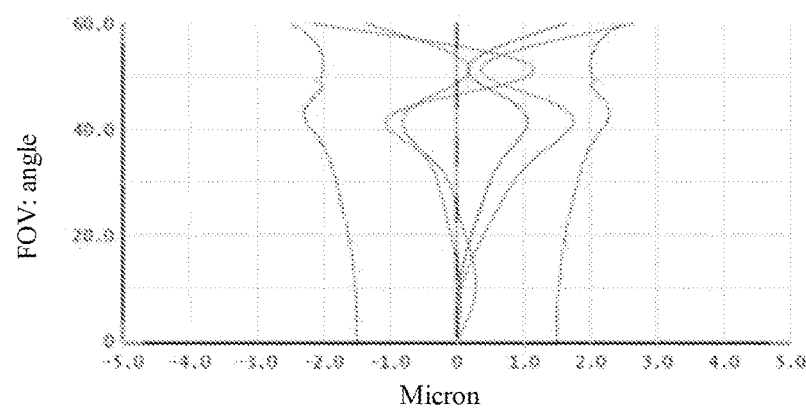
FIG. 1c is a diagram showing lateral chromatic aberration curves of the imaging lens provided by the first embodiment of the present disclosure.
Figure 1D:
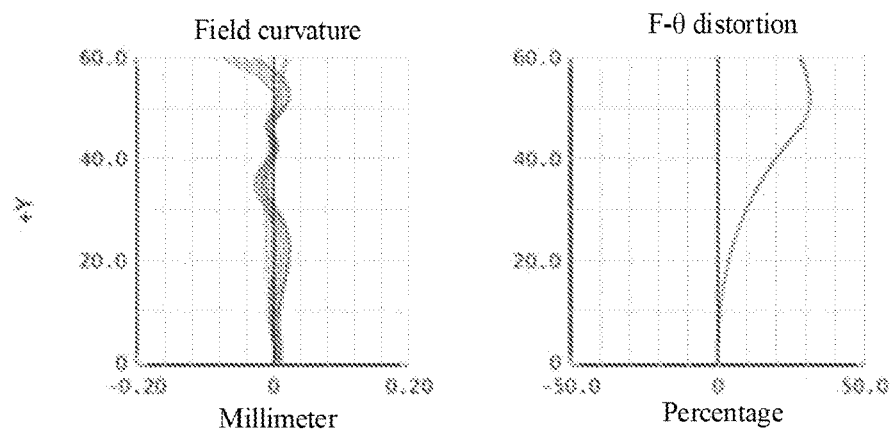
FIG. 1d is a diagram showing field curvature and distortion curves of the imaging lens provided by the first embodiment of the present disclosure.

Referring to FIG. 1b, FIG. 1c and FIG. 1d, on-axis spherical aberration curves, lateral chromatic aberration curves as well as field curvature and distortion curves of the imaging lens in this embodiment are shown. It can be seen from FIG. 1b to FIG. 1d that the on-axis spherical aberrations, lateral chromatic aberrations, field curvature and distortions are all well corrected.

In summary, in the imaging lens provided by this embodiment, five lenses with specific refractive powers are adopted, and specific surface shapes and coordination thereof are adopted. In this way, a wide field of view is provided, and meanwhile, a compact structure, a short total length and a good imaging quality are enabled, thereby achieving a good balance between miniaturization and the wide field of view of the lens. In addition, each of the lenses is an aspherical lens, which provides the following advantages:

1. the system has a good imaging quality;
2. the system is compact; and
3. the total length of the system is short.

Embodiment 2

Figure 2A:
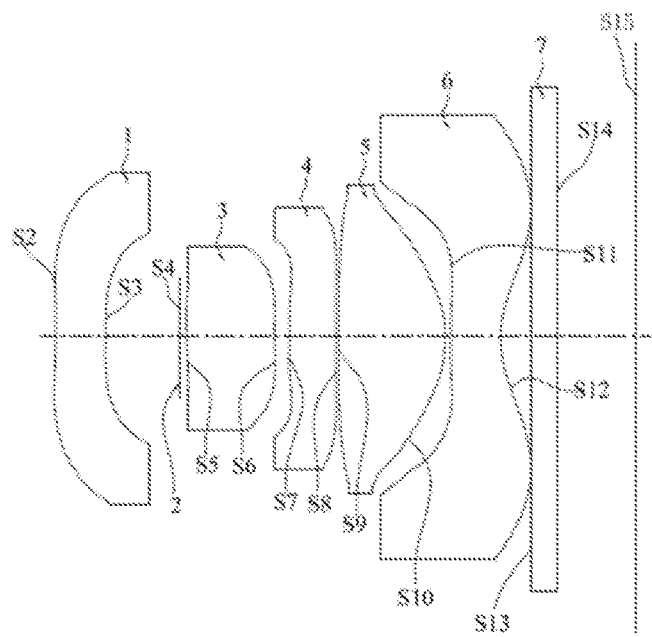
FIG. 2a is a schematic structural diagram of an imaging lens provided by a second embodiment of the present disclosure.

Referring to FIG. 2a, a structural diagram of an imaging lens provided by a second embodiment of the present disclosure is shown. The imaging lens in this embodiment is different from the imaging lens in the first embodiment in that the imaging lens in this embodiment adopts lens parameters which are shown in Tables 2-1, 2-2-A and 2-2-B below.

Referring to Table 2-1, parameters related to various lenses of the imaging lens in this embodiment are shown.

TABLE 2-1

| Surface No. | Surface name | R | d | nd | Vd |
|---|---|---|---|---|---|
| | Object surface | — | — | | |
| S2 | Object side surface of the first lens | -4.185 | 0.395 | | |
| S3 | Image side surface of the first lens | 8.254 | 0.578 | 1.544 | 55.951 |
| S4 | Stop surface | — | 0.052 | | |
| S5 | Object side surface of the second lens | 3.614 | 0.707 | 1.544 | 55.951 |
| S6 | Image side surface of the second lens | -7.226 | 0.111 | | |
| S7 | Object side surface of the third lens | 2.606 | 0.364 | 1.615 | 25.92 |
| S8 | Image side surface of the third lens | 9.809 | 0.020 | | |
| S9 | Object side surface of the fourth lens | 10.739 | 0.848 | 1.544 | 55.951 |
| S10 | Image side surface of the fourth lens | -0.740 | 0.036 | | |
| S11 | Object side surface of the fifth lens | 2.967 | 0.403 | 1.671 | 19.238 |
| S12 | Image side surface of the fifth lens | 0.646 | 0.243 | | |
| S13 | Object side surface of the plate glass | — | 0.210 | 1.517 | 64.198 |
| S14 | Image side surface of the plate glass | — | 0.620 | | |
| S15 | Imaging plane | — | — | | |

Referring to Tables 2-2-A and 2-2-B, coefficients of various aspherical surfaces of the imaging lens in this embodiment are shown.

TABLE 2-2-A

| Surface No. | k | $A_4$ | $A_6$ | $A_8$ | $A_{10}$ |
|---|---|---|---|---|---|
| S2 | -135.939 | 5.45E-01 | -1.64E-01 | -5.55E-01 | 1.28E+00 |
| S3 | 93.985 | 1.25E+00 | -2.74E-01 | -8.36E-01 | -2.99E+00 |
| S5 | 0.000 | -1.44E-01 | -6.09E+00 | 1.53E+02 | -1.92E+03 |
| S6 | 65.258 | -1.55E+00 | 2.12E+00 | -6.51E+00 | -1.77E+00 |
| S7 | -95.335 | -2.19E-01 | -1.83E+00 | -3.93E-01 | 2.65E+00 |
| S8 | 0.000 | -8.79E-02 | -5.18E-02 | 1.98E-02 | -2.52E-02 |
| S9 | 0.000 | 1.26E-02 | -1.36E-02 | 1.49E-05 | 8.93E-03 |
| S10 | -4.376 | -2.51E-01 | 4.97E-02 | -1.35E-01 | 1.07E-01 |
| S11 | -26.910 | -6.48E-01 | -4.34E-01 | 1.53E-01 | 1.83E-01 |
| S12 | -4.926 | -4.36E-01 | 2.74E-01 | -1.38E-01 | 5.38E-02 |

TABLE 2-2-B

| Surface No. | $A_{12}$ | $A_{14}$ | $A_{16}$ | $A_{18}$ | $A_{20}$ |
|---|---|---|---|---|---|
| S2 | -6.95E-01 | -4.33E-01 | 4.48E-01 | 1.98E-01 | -2.09E-01 |
| S3 | 2.33E+01 | 7.59E+00 | -2.00E+00 | -5.41E+01 | -1.56E+02 |
| S5 | 1.10E+04 | -2.40E+04 | 0.00E+00 | 0.00E+00 | 0.00E+00 |
| S6 | 2.58E+00 | 4.27E+01 | -6.50E+01 | -3.66E+01 | -2.62E+02 |
| S7 | -9.99E-01 | -7.22E+00 | -2.00E+01 | -4.10E+01 | 2.91E+01 |
| S8 | | | | | |
| S9 | | | | | |
| S10 | 1.14E-01 | 5.94E-02 | -1.88E-02 | -2.80E-03 | -5.84E-04 |
| S11 | -1.02E-02 | -2.84E-02 | 1.15E-01 | 7.96E-03 | -2.46E-02 |
| S12 | -2.10E-02 | 5.46E-03 | -2.97E-04 | -4.45E-05 | 1.74E-05 |

Figure 2B:
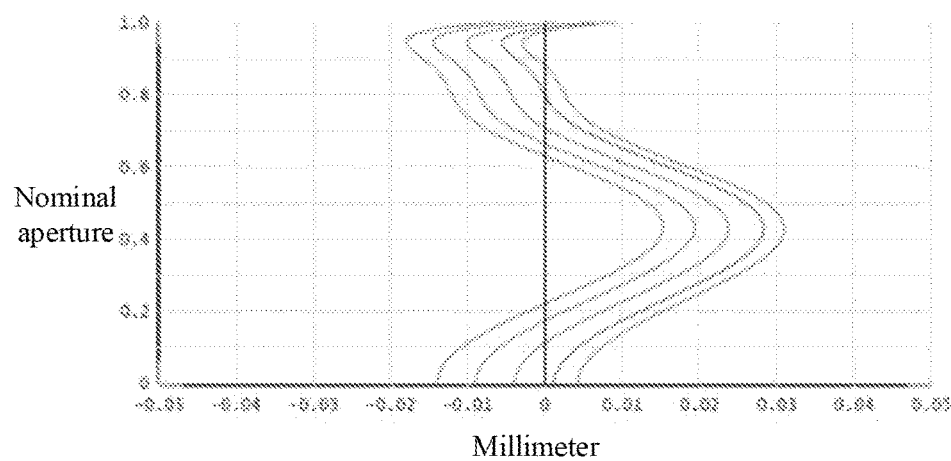
FIG. 2b is a diagram showing on-axis spherical aberration curves of the imaging lens provided by the second embodiment of the present disclosure.
Figure 2C:
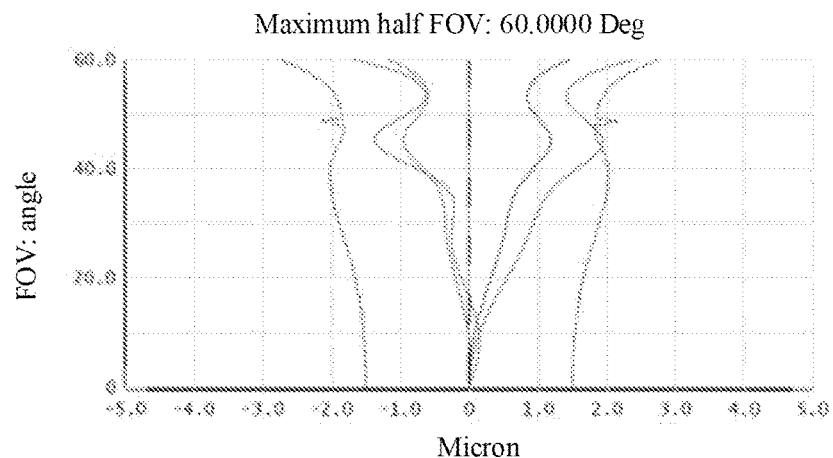
FIG. 2c is a diagram showing lateral chromatic aberration curves of the imaging lens provided by the second embodiment of the present disclosure.
Figure 2D:
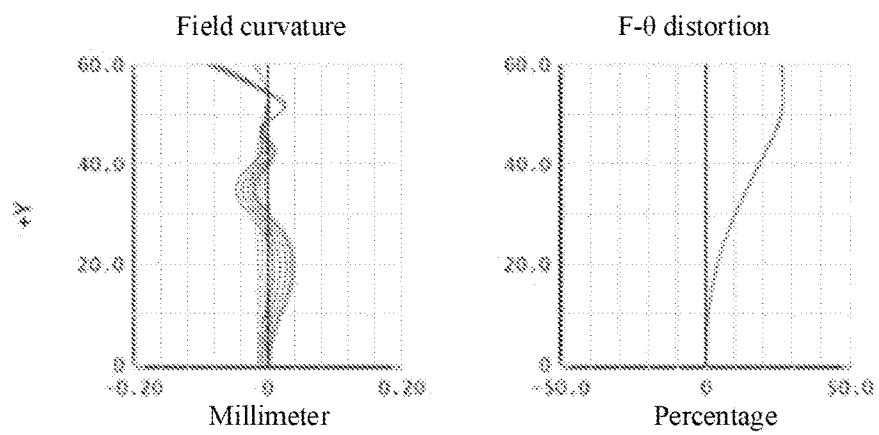
FIG. 2d is a diagram showing field curvature and distortion curves of the imaging lens provided by the second embodiment of the present disclosure.

Referring to FIG. 2b, FIG. 2c and FIG. 2d, on-axis spherical aberration curves, lateral chromatic aberration curves as well as field curvature and distortion curves of the imaging lens in this embodiment are shown. It can be seen from FIG. 2b to FIG. 2d that on-axis spherical aberrations, lateral chromatic aberrations, field curvature and distortions are all well corrected.

Embodiment 3

Figure 3A:
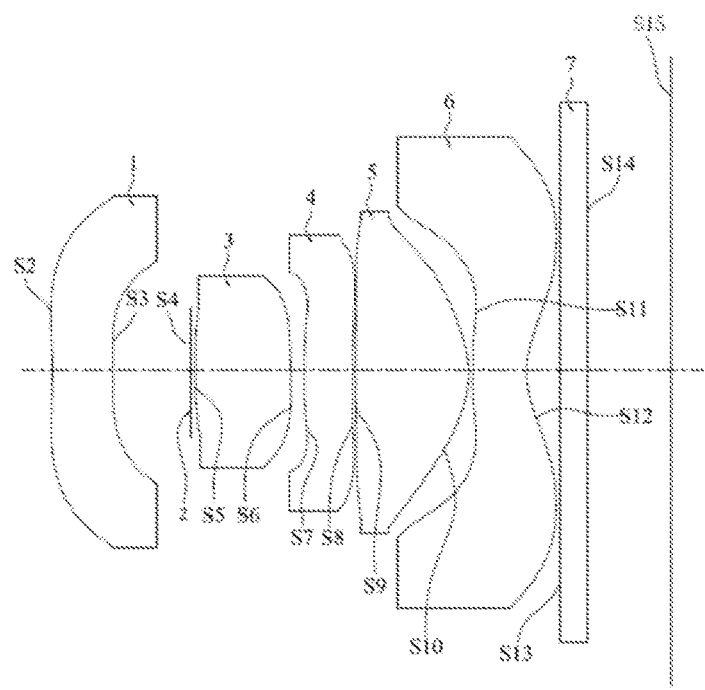
FIG. 3a is a schematic structural diagram of an imaging lens provided by a third embodiment of the present disclosure.

Referring to FIG. 3a, a structural diagram of an imaging lens provided by a third embodiment of the present disclosure is shown. The imaging lens in this embodiment is different from the imaging lens in the first embodiment in that the imaging lens in this embodiment adopts lens parameters which are shown in Tables 3-1, 3-2-A and 3-2-B below.

Referring to Table 3-1, parameters related to various lenses of the imaging lens in this embodiment are shown.

TABLE 3-1

| Surface No. | Surface name | R | d | nd | Vd |
|---|---|---|---|---|---|
|  | Object surface | — | — |  |  |
| S2 | Object side surface of the first lens | -4.732 | 0.448 |  |  |
| S3 | Image side surface of the first lens | 8.459 | 0.577 | 1.544 | 55.951 |
| S4 | Stop surface | — | 0.037 |  |  |
| S5 | Object side surface of the second lens | 3.301 | 0.706 | 1.544 | 55.951 |
| S6 | Image side surface of the second lens | -8.676 | 0.103 |  |  |
| S7 | Object side surface of the third lens | 2.440 | 0.364 | 1.615 | 25.92 |
| S8 | Image side surface of the third lens | 7.718 | 0.020 |  |  |
| S9 | Object side surface of the fourth lens | 63.906 | 0.837 | 1.544 | 55.951 |
| S10 | Image side surface of the fourth lens | -0.713 | 0.036 |  |  |
| S11 | Object side surface of the fifth lens | 2.954 | 0.400 | 1.671 | 19.238 |
| S12 | Image side surface of the fifth lens | 0.665 | 0.243 |  |  |
| S13 | Object side surface of the plate glass | — | 0.210 | 1.517 | 64.198 |
| S14 | Image side surface of the plate glass | — | 0.608 |  |  |
| S15 | Imaging plane | — | — |  |  |

Referring to Tables 3-2-A and 3-2-B, coefficients of various aspherical surfaces of the imaging lens in this embodiment are shown.

TABLE 3-2-A

| Surface No. | k | $A_4$ | $A_6$ | $A_8$ | $A_{10}$ |
|---|---|---|---|---|---|
| S2 | -236.998 | 5.35E-01 | -1.52E-01 | -5.55E-01 | 1.27E+00 |
| S3 | 98.250 | 1.25E+00 | -2.91E-02 | -1.32E+00 | -3.54E+00 |
| S5 | 0.000 | -4.46E-02 | -5.82E+00 | 1.52E+02 | -1.93E+03 |
| S6 | 47.622 | -1.46E+00 | 2.06E+00 | -7.08E+00 | -2.87E+00 |
| S7 | -81.390 | -1.24E-01 | -1.86E+00 | -7.00E-01 | 1.79E+00 |
| S8 | 0.000 | -7.55E-02 | -6.68E-02 | 6.91E-03 | -2.72E-02 |
| S9 | 0.000 | 1.54E-02 | -1.15E-02 | -1.21E-04 | 7.99E-03 |
| S10 | -3.932 | -2.52E-01 | 4.81E-02 | -1.39E-01 | 1.03E-01 |
| S11 | -24.554 | -6.55E-01 | -4.38E-01 | 1.51E-01 | 1.82E-01 |
| S12 | -5.093 | -4.40E-01 | 2.74E-01 | -1.38E-01 | 5.35E-02 |

TABLE 3-2-B

| Surface No. | $A_{12}$ | $A_{14}$ | $A_{16}$ | $A_{18}$ | $A_{20}$ |
|---|---|---|---|---|---|
| S2 | -7.01E-01 | -4.35E-01 | 4.48E-01 | 1.99E-01 | -2.08E-01 |
| S3 | 2.25E+01 | 6.98E+00 | -2.10E+00 | -5.14E+01 | -1.42E+02 |
| S5 | 1.09E+04 | -2.38E+04 | 0.00E+00 | 0.00E+00 | 0.00E+00 |
| S6 | 1.48E+00 | 4.32E+01 | -5.97E+01 | -2.36E+01 | -2.50E+02 |
| S7 | -3.00E+00 | -1.14E+01 | -2.95E+01 | -6.74E+01 | -5.54E+01 |
| S8 |  |  |  |  |  |
| S9 |  |  |  |  |  |
| S10 | 1.12E-01 | 5.86E-02 | -1.85E-02 | -1.83E-03 | 7.31E-04 |
| S11 | -1.17E-02 | -3.00E-02 | 1.13E-01 | 6.53E-03 | -2.58E-02 |
| S12 | -2.11E-02 | 5.44E-03 | -3.00E-04 | -4.51E-05 | 1.68E-05 |

Figure 3B:
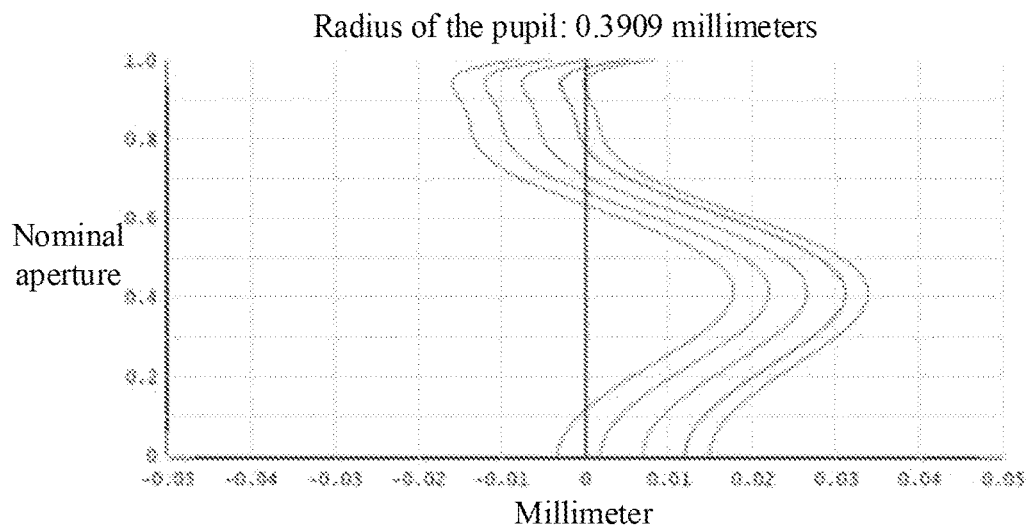
FIG. 3b is a diagram showing on-axis spherical aberration curves of the imaging lens provided by the third embodiment of the present disclosure.
Figure 3C:
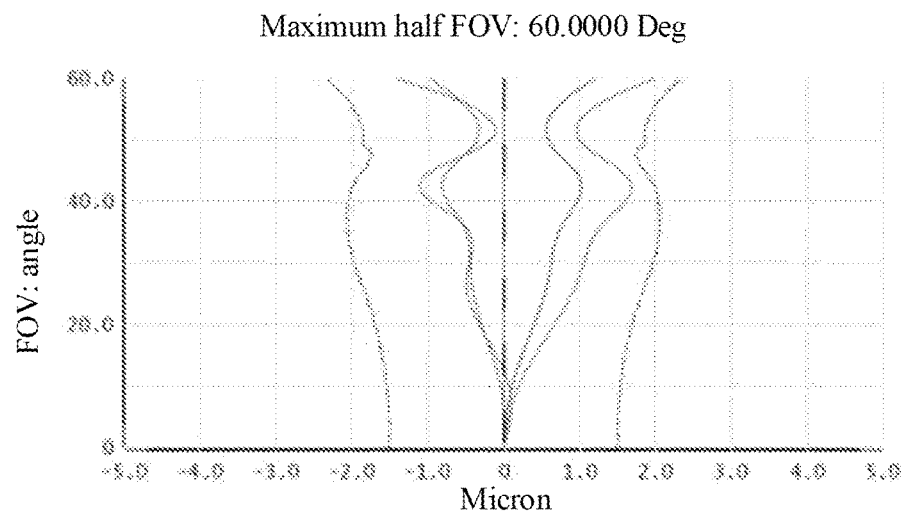
FIG. 3c is a diagram showing lateral chromatic aberration curves of the imaging lens provided by the third embodiment of the present disclosure.
Figure 3D:
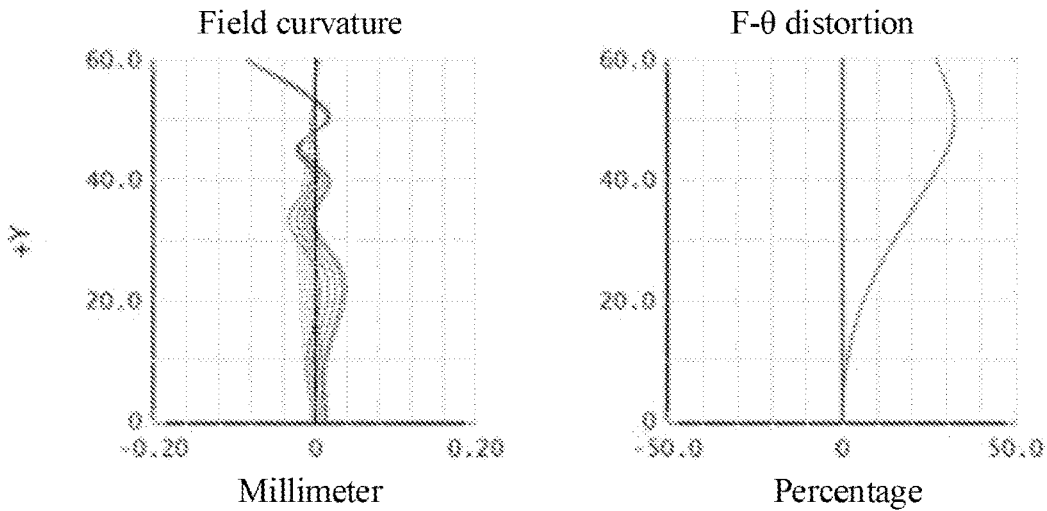
FIG. 3d is a diagram showing field curvature and distortion curves of the imaging lens provided by the third embodiment of the present disclosure.

Referring to FIG. 3b, FIG. 3c and FIG. 3d, on-axis spherical aberration curves, lateral chromatic aberration curves as well as field curvature and distortion curves of the imaging lens in the embodiment are shown. It can be seen from FIG. 3b to FIG. 3d that on-axis spherical aberrations, lateral chromatic aberrations, field curvature and distortions are all well corrected.

Embodiment 4

Figure 4A:
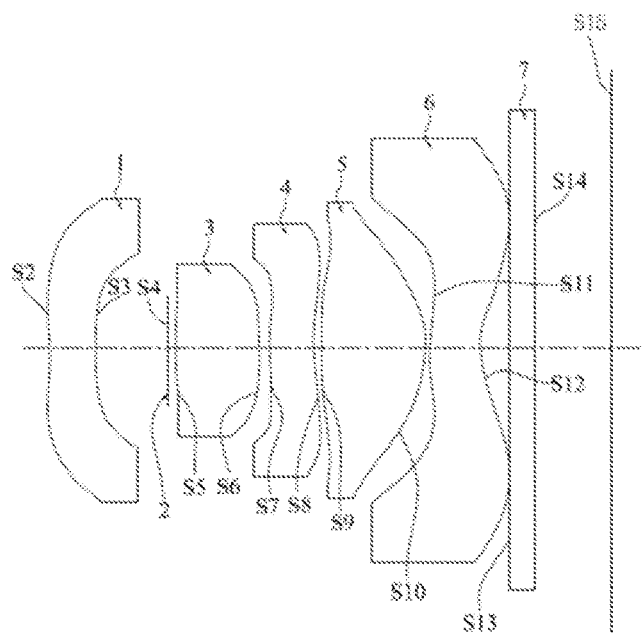
FIG. 4a is a schematic structural diagram of an imaging lens provided by a fourth embodiment of the present disclosure.

Referring to FIG. 4a, a structural diagram of an imaging lens provided by a fourth embodiment of the present disclosure is shown. The imaging lens in this embodiment is different from the imaging lens in the first embodiment in that the imaging lens in this embodiment adopts lens parameters which are shown in Tables 4-1, 4-2-A and 4-2-B below.

Referring to Table 4-1, parameters related to various lenses of the imaging lens in this embodiment are shown.

TABLE 4-1

| Surface No. | Surface name | R | d | nd | Vd |
|---|---|---|---|---|---|
| | Object surface | — | — | | |
| S2 | Object side surface of the first lens | -3.580 | 0.384 | | |
| S3 | Image side surface of the first lens | 11.626 | 0.578 | 1.544 | 55.951 |
| S4 | Stop surface | — | 0.065 | | |
| S5 | Object side surface of the second lens | 3.723 | 0.684 | 1.544 | 55.951 |
| S6 | Image side surface of the second lens | -6.615 | 0.085 | | |
| S7 | Object side surface of the third lens | 2.361 | 0.364 | 1.615 | 25.92 |
| S8 | Image side surface of the third lens | 2.647 | 0.058 | | |
| S9 | Object side surface of the fourth lens | 3.617 | 0.855 | 1.544 | 55.951 |
| S10 | Image side surface of the fourth lens | -0.740 | 0.036 | | |
| S11 | Object side surface of the fifth lens | 2.240 | 0.400 | 1.671 | 19.238 |
| S12 | Image side surface of the fifth lens | 0.622 | 0.243 | | |
| S13 | Object side surface of the plate glass | — | 0.210 | 1.517 | 64.198 |
| S14 | Image side surface of the plate glass | — | 0.628 | | |
| S15 | Imaging plane | — | — | | |

Referring to Tables 4-2-A and 4-2-B, coefficients of various aspherical surfaces of the imaging lens in this embodiment are shown.

TABLE 4-2-A

| Surface No. | k | $A_4$ | $A_6$ | $A_8$ | $A_{10}$ |
|---|---|---|---|---|---|
| S2 | -102.236 | 6.50E-01 | -2.12E-01 | -6.78E-01 | 1.74E+00 |
| S3 | 193.215 | 1.51E+00 | -2.73E-01 | 7.50E-02 | -1.04E+01 |
| S5 | 0.000 | 3.02E-02 | -8.68E+00 | 1.57E+02 | -1.64E+03 |
| S6 | 75.820 | -1.59E+00 | 7.35E-01 | -2.73E+00 | 8.76E-01 |
| S7 | -48.495 | -4.91E-01 | -1.81E+00 | -7.34E-02 | 1.74E+00 |
| S8 | 0.000 | -1.55E-01 | -8.20E-02 | 2.26E-02 | -2.06E-02 |
| S9 | 0.000 | -3.30E-02 | -3.98E-02 | -1.06E-02 | 1.02E-02 |
| S10 | -4.228 | -1.70E-01 | -1.63E-01 | 4.44E-02 | 1.89E-01 |
| S11 | -18.249 | -5.65E-01 | -4.34E-01 | 2.33E-01 | 1.45E-01 |
| S12 | -4.775 | -4.76E-01 | 3.01E-01 | -1.26E-01 | 4.47E-02 |

TABLE 4-2-B

| Surface No. | $A_{12}$ | $A_{14}$ | $A_{16}$ | $A_{18}$ | $A_{20}$ |
|---|---|---|---|---|---|
| S2 | -1.19E+00 | -3.71E-01 | 7.80E-01 | 4.94E-02 | -2.74E-01 |
| S3 | 4.95E+01 | -4.60E+00 | -3.17E+01 | -1.02E+02 | -1.33E+02 |
| S5 | 8.30E+03 | -1.70E+04 | 0.00E+00 | 0.00E+00 | 0.00E+00 |
| S6 | -1.16E+01 | 3.22E+01 | -4.48E+01 | 9.49E+01 | -6.03E+02 |
| S7 | -6.72E+00 | 1.14E+01 | -1.23E+01 | -1.43E+02 | 1.05E+02 |
| S8 | | | | | |
| S9 | | | | | |
| S10 | 6.33E-02 | -1.75E-03 | -6.54E-02 | -2.90E-02 | 8.09E-03 |
| S11 | -9.97E-03 | -3.02E-02 | 9.46E-02 | -6.64E-03 | -4.59E-02 |
| S12 | -2.10E-02 | 5.72E-03 | -2.00E-04 | -5.91E-05 | 7.42E-06 |

Figure 4B:
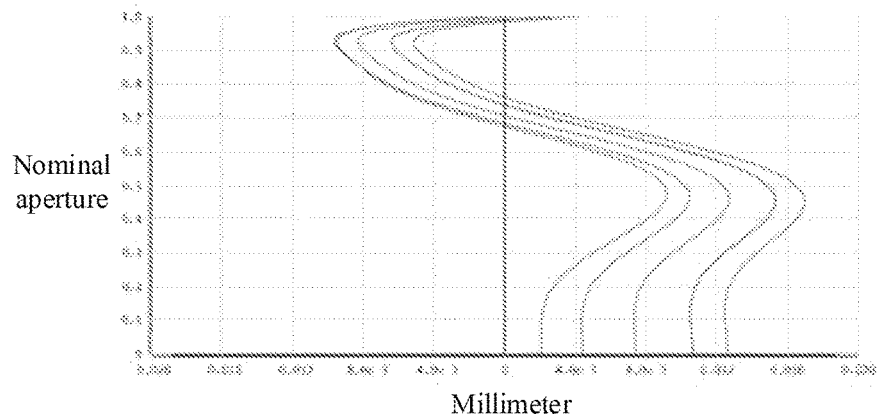
FIG. 4b is a diagram showing on-axis spherical aberration curves of the imaging lens provided by the fourth embodiment of the present disclosure.
Figure 4C:
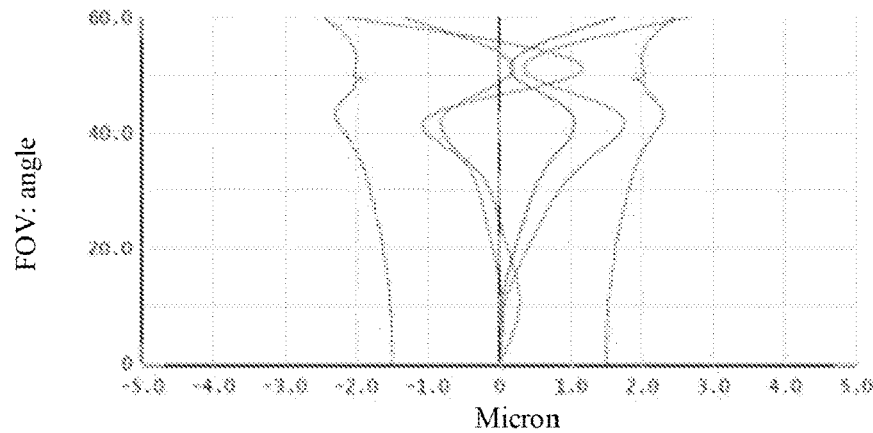
FIG. 4c is a diagram showing lateral chromatic aberration curves of the imaging lens provided by the fourth embodiment of the present disclosure.
Figure 4D:
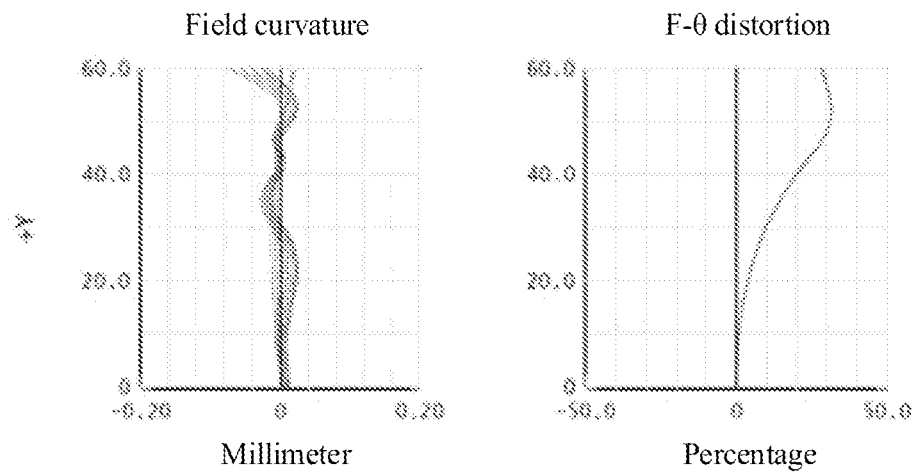
FIG. 4d is a diagram showing field curvature and distortion curves of the imaging lens provided by the fourth embodiment of the present disclosure.

Referring to FIG. 4b, FIG. 4c and FIG. 4d, on-axis spherical aberration curves, lateral chromatic aberration curves as well as field curvature and distortion curves of the imaging lens in the embodiment are shown. It can be seen from FIG. 4b to FIG. 4d that on-axis spherical aberrations, lateral chromatic aberrations, field curvature and distortions are all well corrected.

Referring to Table 5, optical characteristics and values of above expressions corresponding to above four embodiments are shown. The optical characteristics include the focal length f of the system, the aperture number F #, the total optical length TTL, and the field of view (FOV) 2θ.

TABLE 5

| Optical characteristics or expressions | Embodiment 1 | Embodiment 2 | Embodiment 3 | Embodiment 4 |
|---|---|---|---|---|
| f (mm) | 1.706 | 1.720 | 1.730 | 1.704 |
| F# | 2.216 | 2.222 | 2.224 | 2.217 |
| TTL (mm) | 4.590 | 4.586 | 4.589 | 4.590 |
| 2θ | 120° | 120° | 120° | 120° |
| $|R_4/R_3|$ | 1.775 | 1.999 | 2.628 | 1.777 |
| $R_6/R_5$ | 1.120 | 3.763 | 3.163 | 1.121 |
| $(CT_1 + CT_2 + CT_3 + CT_4 + CT_5)/T_d$ | 0.766 | 0.773 | 0.781 | 0.766 |
| $(V_3 - V_5)$ | 6.682 | 6.682 | 6.682 | 6.682 |
| $f_1/f$ | -2.918 | -2.926 | -3.195 | -2.917 |
| $f_{34}/f$ | 0.732 | 0.701 | 0.702 | 0.733 |
| $(R_7 + R_8)/(R_7 - R_8)$ | 0.660 | 0.871 | 0.978 | 0.660 |
| $f_2/f_3$ | 0.187 | 0.803 | 0.797 | 0.188 |
| $T_d/ImgH$ | 0.764 | 0.766 | 0.770 | 0.765 |

It should be noted that, the imaging lens of any of the above Embodiments 1-4 can be applied in terminal devices such as mobile phones, tablets, security monitoring equipment, and driving recorders.

In the imaging lens provided by the embodiments of the present disclosure, five lenses with specific refractive powers are adopted, and specific surface shapes and coordination thereof are adopted. In this way, a wide field of view is provided, and meanwhile, a compact structure, a short total length and a good imaging quality are enabled, thereby achieving a good balance between miniaturization and the wide field of view of the lens.

Embodiment 5

Figure 5:
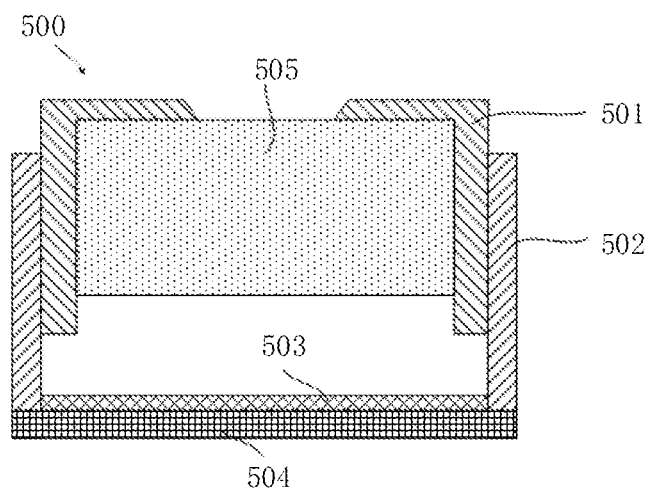
FIG. 5 is a schematic structural diagram showing a cross-section of a camera module provided by a fifth embodiment of the present disclosure.

Referring to FIG. 5, a cross-section of a camera module 500 provided by this embodiment is illustrated. The camera module 500 includes a barrel 501, a holder 502, an image sensor 503, a printed circuit board 504, and an imaging lens 505 provided by any of the embodiments as described above. The imaging lens 505 is received in the barrel 501, and the barrel 501 is engaged with the holder 502. The image sensor 503 and the printed circuit board 504 are substantially accommodated in the holder 502. The image sensor 503 is opposite to the imaging lens 505 and is mounted on the printed circuit board 504. The image sensor 503 is configured for converting light signal into electrical signals, thereby the images formed by the imaging lens 505 can be converted and transmitted to a processor. The printed circuit board 504 can be further electrically connected to a chip or the processor via a flexible circuit board.

Embodiment 6

Figure 6:
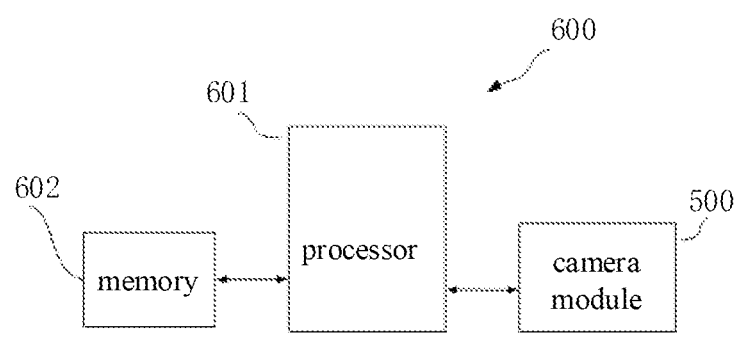
FIG. 6 is a schematic block diagram of a camera provided by a sixth embodiment of the present disclosure.
Figure 7:
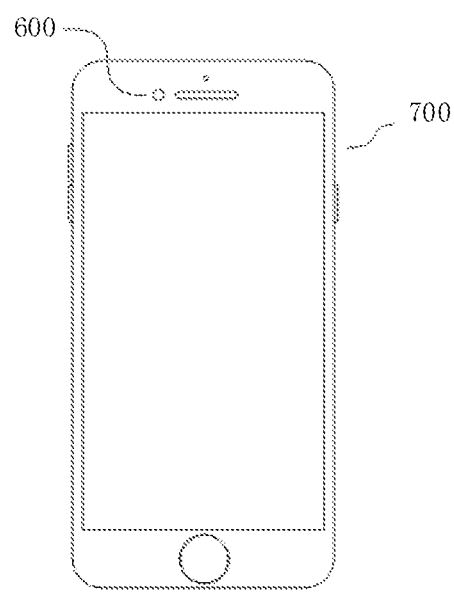
FIG. 7 is a schematic diagram of the camera provided by the sixth embodiment of the present disclosure.

Referring to FIG. 6 and FIG. 7, a camera 600 is applied to an electronic device 700. Here, the camera 600 is illustrated as a front camera of an electronic device, but it also may be a rear camera of the electronic device, which is not limited in the embodiments of the present disclosure. The camera 600 includes the camera module 500 as mentioned above, a processor 601, and a memory 602. The camera module 500 is configured to capture images, the processor 601 is configured to process the captured images, and the memory 602 is configured to store the captured images. The processor 601 is communicated with the camera module 500 and the memory 602. That is, the electrical signals of the images can be transmitted to the processor 601 and stored in the memory 602.

The above embodiments only illustrate several implementations of the present disclosure, and the descriptions thereof are specific and detailed, but they should not be understood as limiting the scope of the present disclosure. It should be noted that, for those of ordinary skill in the art, several variants and modifications can be made without departing from the concept of the present disclosure, and they all fall within the protection scope of the present disclosure. Therefore, the protection scope of the patent of the present disclosure should be subject to the appended claims.

What is claimed is:

1. An imaging lens, wherein the imaging lens comprises five lenses, and from an object side to an imaging plane, the five lenses are as follows:
   a first lens with a negative refractive power, wherein a paraxial region of an object side surface of the first lens is concave;
   a second lens with a positive refractive power;
   a third lens with a positive refractive power, wherein a paraxial region of an image side surface of the third lens is concave, and at least a portion away from an optical axis of the image side surface of the third lens is convex;
   a fourth lens with a positive refractive power; and
   a fifth lens with a negative refractive power;
   wherein the imaging lens satisfies expressions:

$3.163 \leq R_6/R_5 < 4$;

$0 < f_{34}/f < 1$;

$6.682 \leq (V_3 - V_5) < 7$;

$0.797 \leq f_2/f_3 < 1$; and $1.999 \leq |R_4/R_3| \leq 2.628$;

where $R_5$ represents a radius of curvature of an object side surface of the third lens, $R_6$ represents a radius of curvature of the image side surface of the third lens, $f_{34}$ represents a combined focal length of the third lens and the fourth lens, f represents a focal length of the imaging lens, $V_3$ represents a dispersion coefficient of the third lens, $V_5$ represents a dispersion coefficient of the fifth lens, $f_2$ represents a focal length of the second lens, $f_3$ represents a focal length of the third lens, $R_3$ represents a radius of curvature of an object side surface of the second lens, and $R_4$ represents a radius of curvature of an image side surface of the second lens.

2. The imaging lens according to claim 1, wherein the imaging lens satisfies an expression:

$0 < (CT_1 + CT_2 + CT_3 + CT_4 + CT_5)/T_d < 1$;

where $CT_1$ represents a center thickness of the first lens, $CT_2$ represents a center thickness of the second lens, $CT_3$ represents a center thickness of the third lens, $CT_4$ represents a center thickness of the fourth lens, $CT_5$ represents a center thickness of the fifth lens, and Ta represents a distance on the optical axis that is between the object side surface of the first lens and an image side surface of the fifth lens.

3. The imaging lens according to claim 1, wherein the imaging lens satisfies an expression:

$-3.5 < f_1/f < -2.5$;

where $f_1$ represents a focal length of the first lens.

4. The imaging lens according to claim 1, wherein the imaging lens satisfies an expression:

$0 < (R_7 + R_8)/(R_7 - R_8) < 1$;

where $R_7$ represents a radius of curvature of an object side surface of the fourth lens, and $R_8$ represents a radius of curvature of an image side surface of the fourth lens.

5. The imaging lens according to claim 1, wherein each of the lenses is an aspherical lens.

6. The imaging lens according to claim 1, further comprising a stop disposed between the first lens and the second lens.

7. The imaging lens according to claim 1, further comprising a plate glass disposed between the fifth lens and the imaging plane.

8. The imaging lens according to claim 1, wherein the imaging lens satisfies expressions:

$1 \leq CT_2/ET_2 \leq 1.5$;

$CT_4/ET_4 \geq 3$; and $CT_5/ET_5 \leq 0.5$;

where $CT_2$ represents a center thickness of the second lens, $ET_2$ represents an edge thickness of the second lens, $CT_4$ represents a center thickness of the fourth lens, $ET_4$ represents an edge thickness of the fourth lens, $CT_5$ represents a center thickness of the fifth lens, and $ET_5$ represents an edge thickness of the fifth lens.

9. The imaging lens according to claim 1, wherein a center thickness of the fourth lens is greater than that of each of the first lens, the second lens, the third lens and the fifth lens.

10. The imaging lens according to claim 1, wherein an edge thickness of the fifth lens is greater than that of each of the first lens, the second lens, the third lens and the fourth lens.

11. A camera module, comprising an imaging lens and an image sensor opposite to the imaging lens, wherein the imaging lens comprises five lenses, and from an object side to an imaging plane, the five lenses are as follows:
- a first lens having a negative refractive power, wherein a paraxial region of an object side surface of the first lens is concave;
- a second lens having a positive refractive power;
- a third lens having a positive refractive power, wherein a paraxial region of an image side surface of the third lens is concave, and at least a portion away from an optical axis of the image side surface of the third lens is convex;
- a fourth lens having a positive refractive power; and
- a fifth lens having a negative refractive power;

wherein the imaging lens satisfies expressions:

$1.999 \leq |R_4/R_3| \leq 2.628$;

$3.163 \leq R_6/R_5 < 4$;

$0 < f_{34}/f < 1$; and $0.797 \leq f_2/f_3 < 1$;

where $R_3$ represents a radius of curvature of an object side surface of the second lens, $R_4$ represents a radius of curvature of an image side surface of the second lens, $R_5$ represents a radius of curvature of an object side surface of the third lens, $R_6$ represents a radius of curvature of the image side surface of the third lens, $f_{34}$ represents a combined focal length of the third lens and the fourth lens, f represents a focal length of the imaging lens, $f_2$ represents a focal length of the second lens, and $f_3$ represents a focal length of the third lens.

12. The camera module according to claim 11, wherein the imaging lens satisfies an expression:

$0 < (CT_1 + CT_2 + CT_3 + CT_4 + CT_5)/T_d < 1$;

where $CT_1$ represents a center thickness of the first lens, $CT_2$ represents a center thickness of the second lens, $CT_3$ represents a center thickness of the third lens, $CT_4$ represents a center thickness of the fourth lens, $CT_5$ represents a center thickness of the fifth lens, and Ta represents a distance on the optical axis that is between the object side surface of the first lens and an image side surface of the fifth lens.

13. The camera module according to claim 11, wherein the imaging lens satisfies an expression:

$-3.5 < f_1/f < -2.5$;

where $f_1$ represents a focal length of the first lens.

14. The camera module according to claim 11, wherein the imaging lens satisfies an expression:

$0 < (R_7 + R_8)/(R_7 - R_8) < 1$;

where $R_7$ represents a radius of curvature of an object side surface of the fourth lens, and $R_8$ represents a radius of curvature of an image side surface of the fourth lens.

15. A camera, comprising:
- a camera module, configured to capture one or more images;
- a processor, configured to process the captured one or more images;
- a memory, configured to store the captured one or more images;
- wherein the camera module comprises an imaging lens and an image sensor opposite to the imaging lens, the imaging lens comprises five lenses, and from an object side to an imaging plane, the five lenses are as follows:
  - a first lens with a negative refractive power, wherein a paraxial region of an object side surface of the first lens is concave;
  - a second lens with a positive refractive power;
  - a third lens with a positive refractive power, wherein a paraxial region of an image side surface of the third lens is concave, and at least a portion away from an optical axis of the image side surface of the third lens is convex;
  - a fourth lens with a positive refractive power; and
  - a fifth lens with a negative refractive power;

wherein the imaging lens satisfies expressions:

$0 < f_{34}/f < 1$;

$-3.5 < f_1/f < -2.5$;

$3.163 \leq R_6/R_5 < 4$; and $0.797 \leq f_2/f_3 < 1$;

where $f_{34}$ represents a combined focal length of the third lens and the fourth lens, f represents a focal length of the imaging lens, $f_1$ represents a focal length of the first lens, $f_2$ represents a focal length of the second lens, $f_3$ represents a focal length of the third lens, $R_5$ represents a radius of curvature of an object side surface of the third lens, and $R_6$ represents a radius of curvature of the image side surface of the third lens.

* * * * *